United States Patent [19]
Herbert

[11] Patent Number: 5,325,445
[45] Date of Patent: Jun. 28, 1994

[54] FEATURE CLASSIFICATION USING SUPERVISED STATISTICAL PATTERN RECOGNITION

[75] Inventor: Thomas F. Herbert, Rochester, N.Y.

[73] Assignee: Eastman Kodak Company, Rochester, N.Y.

[21] Appl. No.: 890,401

[22] Filed: May 29, 1992

[51] Int. Cl.$^5$ .............................................. G06K 9/68
[52] U.S. Cl. ........................................ 382/38; 382/14; 382/39
[58] Field of Search ...................... 382/48, 36, 37, 38, 382/39, 34, 14, 15; 395/10, 50, 75

[56]  References Cited

U.S. PATENT DOCUMENTS

| | | | |
|---|---|---|---|
| 3,623,015 | 11/1971 | Schmitz et al. | 340/172.5 |
| 4,613,519 | 9/1986 | Yacobi | 427/39 |
| 4,770,184 | 9/1988 | Greene, Jr. et al. | 128/661.08 |
| 4,783,802 | 11/1988 | Takebayashi et al. | 381/41 |
| 4,975,974 | 12/1990 | Nishijima et al. | 382/34 |
| 4,975,975 | 12/1990 | Filipski | 382/38 |
| 4,977,603 | 12/1990 | Irie et al. | 382/36 |
| 5,058,182 | 10/1991 | Kuan et al. | 382/36 |
| 5,075,896 | 12/1991 | Wilcox et al. | 382/39 |
| 5,077,807 | 12/1991 | Bokser | 382/36 |
| 5,142,593 | 8/1992 | Kasano | 382/36 |
| 5,181,259 | 1/1993 | Rorvig | 382/36 |
| 5,185,813 | 2/1993 | Tsujimoto | 382/37 |
| 5,187,751 | 2/1993 | Tanaka | 382/36 |

OTHER PUBLICATIONS

Aristides A. G. Requicha, "Representations for Rigid Solids: Theory, Methods, and Systems," *Computing Surveys*, vol. 12, No. 4, pp. 437-463, Dec. 1980.
EKTRON VEREDUS ® "Surface Flaw Detection and Analysis System for Metal Coil, Plastic, Paper Roll Products, and other Web Processed Materials"; EKTRON Applied Imaging, Inc., 1991.
Duda et al., *Pattern Classification and Scene Analysis*, Chapter 2, pp. 10-20; Chapter 3, pp. 44-49; Chapter 4, pp. 85-105 and Chapter 6, pp. 189-190, 1973.
Winston, Patrick Henry, *Artificial Intelligence*, Second Edition, Chapter 4, pp. 87-88 & 114-117, 1984.
Fu, K. S., *Syntactic Pattern Recognition and Applications*, Chapter 3, pp. 79-97, 1982.

*Primary Examiner*—Joseph Mancuso
*Attorney, Agent, or Firm*—Kevin P. Radigan

[57]  ABSTRACT

Feature classification using a novel supervised statistical pattern recognition approach is described. A tree-like hierarchical decomposition of n-dimensional feature space is created off-line from an image processing system. The hierarchical tree is created through a minimax-type decompositional segregation of n-dimensional feature vectors of different feature classifications within the corresponding feature space. Each cell preferably contains feature vectors of only one feature classification, or is empty, or is of a predefined minimum cell size. Once created, the hierarchical tree is made available to the image processing system for real-time defect classification of features in a static or moving pattern. Each feature is indexed to the classification tree by locating its corresponding feature vector in the appropriate feature space cell as determined by a depth-first search of the hierarchical tree. The smallest leaf node which includes that feature vector provides the statistical information on the vector's classification.

35 Claims, 6 Drawing Sheets fig. 1 fig. 2 fig. 3 fig. 4 fig. 5 fig. 6 fig. 7

FEATURE CLASSIFICATION USING SUPERVISED STATISTICAL PATTERN RECOGNITION

BACKGROUND OF INVENTION

1. Technical Field

This invention relates in general to feature classification techniques for a static or moving image, and more particularly, to a feature classification system and method which employ supervised statistical pattern recognition using a novel vector classification model of spatially decomposed multi-dimensional feature space.

2. Background Art

As the use of optical scanning and electronic imperfection detection have continued to increase, automatic differentiation of defect classes has come within reach of available technology. Pattern recognition is applicable to feature classification problems because pattern recognition automatically assigns a physical object or event to one of several pre-specified categories. Each defect (or feature) shows up as a connected region in the image and each defect can be assigned to a category.

There are two types of pattern recognition (PR), structural and statistical. Structural methods use a representation of a feature's shape known as a boundary representation (BREP), while statistical methods use an array of numbers or measurements containing properties of each feature; this numerical information is called a feature vector. In structural pattern recognition the picture of the feature can be recreated from the reduced data since the BREP has complete boundary information in polygonal form. In statistical pattern recognition, however, the picture cannot be recreated from its representation; but, a feature vector is a more compact representation of the object than a BREP. With either method, the goal is to construct a classifier, i.e., a machine to automatically process the image to generate a classification for each feature.

Figure 1:
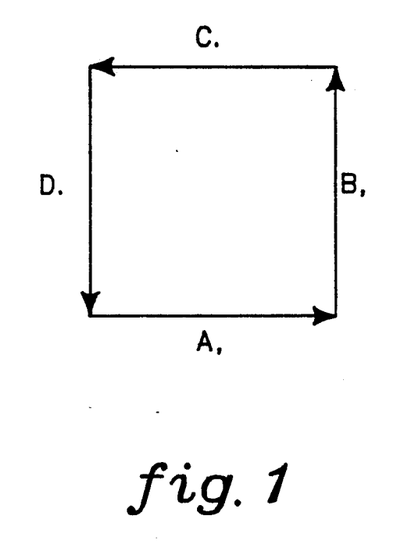
FIG. 1 depicts by way of example a representation of a structural pattern language.

In structural pattern recognition, the classifier is based on formal language theory. The BREP is processed into a series of symbols representing the length and direction of the vectors in the boundary. A set of strings consisting of concatenations of these symbols is the language. The grammar, which is a mathematical system of describing the language, describes the structure or the boundary of the features as ordered combinations of symbols. A recognizer, which is constructed from this grammar, works like a computer language compiler used to recognize and distinguish computer language statements. For example, the box of FIG. 1 can be thought of as a language. As shown, $L = \{a^n, b^n, c^n, d^n | n \geq 1)\}$ is a language describing the box with each side of length "1" or greater.

In real-world problems a feature or defect does not have an exact description so the problem is more difficult than parsing a computer language. A structural recognizer that can handle realistic problems has to be based on complicated context sensitive or stochastic grammars to deal with high data complexity and variation. Because of this, structural methods are not readily implemented in typical engineering situations.

In contrast, statistical pattern recognition uses a recognizer based on statistical decision theory. Several different types of statistical pattern recognition exist but in general there are two main approaches, called supervised and unsupervised classification.

Supervised classification uses a labelled training sample formed when an expert identifies the category of each member of the sample. Probability distributions are estimated or recognizers are constructed directly from the training sample. An expert must examine the data and label each of the features. (Again, the novel pattern recognition approach described herein uses supervised classification.) The effort of labelling a training sample can be made easier by providing a graphical interface to facilitate an expert's interaction with the data.

Unsupervised classification doesn't use a labelled training sample. This approach requires the recognizer to learn the underlying probability distribution of the data as it goes, which is often a difficult problem. However, unsupervised classification also does not require the sometimes lengthy process of accumulating a sufficiently large training sample and it does not necessarily require the effort of identifying the members of this sample. The method can be useful in augmenting supervised classification by allowing the system to adapt to changes in the data.

In addition to the above-noted approaches, statistical pattern recognition employs two main methods, parametric and non-parametric. Parametric methods assume an underlying probability distribution of the real world data. Non-parametric methods make no such assumptions.

Parametric methods are generally used when the distribution is known to be in one of the familiar forms, such as Normal or Gaussian. Classifiers can be generated based on Bayes rule with the a priori distributions known and joint probability distributions determined from the sample data. Specific features can then be compared to the statistics of the known distribution function thereby classifying them.

Figure 2:
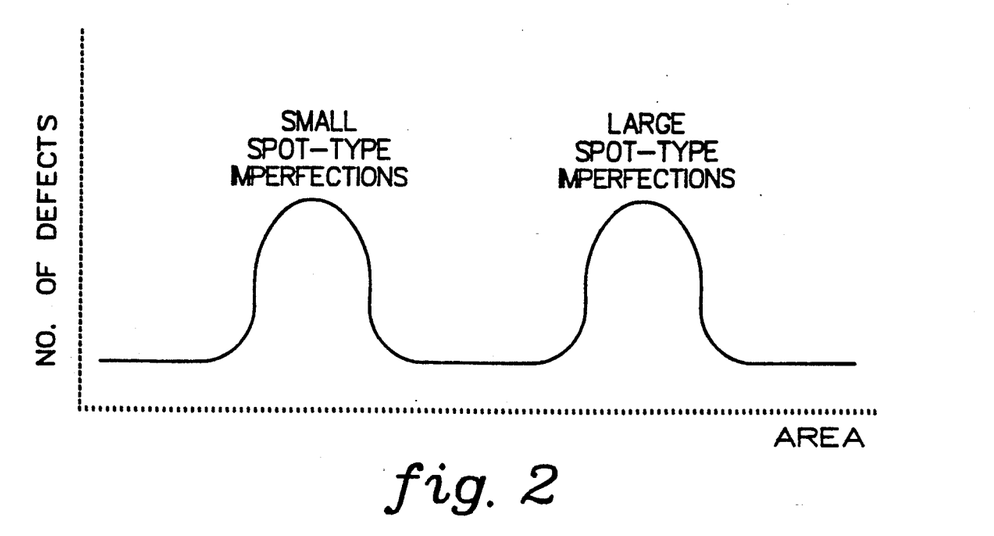
FIG. 2 graphically depicts a sample multi-modal distribution of a given class of defects over a defined area.

In real-world situations, the data often does not conveniently fall into a Normal or other known distribution. The distribution of a class of features might be multi-modal, i.e., with two or more peaks in the distribution of a defect category (e.g., see FIG. 2). As in the example of FIG. 2, spot like defects are roundish and easily recognized by an approximately equal length and width, but there might be relatively small and large defects all of which are known as spots. In this example, the spots might be better recognized as the ratio of area to perimeter, which will remain approximately constant as the size of the roundish spots vary. Although a specialized recognizer can be constructed to deal with this example, a method is needed which is generally applicable.

Non-parametric methods provide a more general solution to the above problem in that they generate decision functions or a classifier directly from a training sample. By doing this such approaches bypass the parameter estimation problem and ignore any presumed form for the density function. (As described below, the present invention comprises a non-parametric technique.)

One of the main difficulties of non-parametric methods is the exponential increase in storage and computational requirements as the dimensionality increases. If the feature is described by a large number of measurements (or elements), the problem can grow to be very large when some of the known methods are used. (Since the technique of the present invention divides the feature space recursively by powers of two, the problem is made more manageable because the storage space only increases as the log base 2.)

SUMMARY OF THE INVENTION

Briefly described, in one aspect a method for generating a statistical classification model from a sample test image having a plurality of features thereon is provided. The statistical model is used for real-time supervised feature classification by an associated image processing system. The model generating method includes the steps of: imaging the sample test image having the plurality of features thereon and producing a digital representation thereof; using the digital image representation to assign a unique classification to selected features of the same type; producing an n-element feature vector for each feature classified, the n-element feature vectors defining an associated n-dimensional feature space; using the assigned classifications to cluster the corresponding feature vectors in feature space, wherein this clustering employs a minimax search to define a tree-like hierarchical decomposition of n-dimensional feature space; and storing the hierarchically decomposed n-dimensional feature space for access by the image processing system during real-time feature classifying of a new pattern.

In another aspect, the present invention comprises a real-time image processing method for classifying web features using a supervised statistical classifier. The statistical classifier comprises a tree-like hierarchical decomposition of n-dimensional feature space wherein different feature types are clustered in different feature space cells of the hierarchical tree. This method includes the steps of: imaging the web and producing a digital representation thereof, the imaging operation including producing an n-dimensional feature vector for each imaged feature of the web; referencing the supervised statistical classifier and automatically locating imaged features within corresponding feature space cells of the tree-like hierarchical decomposition of n-dimensional feature space, this locating step comprising searching the hierarchical decomposition of feature space for the smallest cell of the hierarchical tree including the feature vector; and accumulating statistics on imaged features based on the located feature vectors relative to the hierarchical tree. The accumulated statistics include a feature-type classification for the corresponding web feature.

In still another aspect of the present invention, a real-time image processing system for classifying web features using a supervised statistical classifier is provided. The statistical classifier comprises a tree-like hierarchical decomposition of n-dimensional feature space wherein different feature types are clustered in different feature space cells of the hierarchical tree. The system includes imaging means for producing a digital image representation of the web, including n-dimensional feature vectors for selected web features. Referencing means for accessing the supervised statistical classifier in a real-time manner and automatically locating feature vectors within corresponding feature space cells of the tree-like hierarchical decomposition of n-dimensional feature space are also provided. For each located feature vector, the locating means includes searching means for traversing the hierarchical decomposition of feature space for the smallest cell of the hierarchical tree including the subject feature vector. Finally, accumulating means accumulates statistics on the selected web features based on their location within the hierarchical tree. The statistics provide for each located feature vector a feature-type classification of the corresponding web feature.

Numerous additional method and system enhancements are also described and claimed herein.

It will be observed from the above discussion that a novel method for generating a statistical model from a sampled test image (or, preferably, a plurality of sampled test images) is provided. The flexible, non-parametric approach presented produces a classification tree to be searched by an on-line image processing system, e.g. as part of a quality control process. The processing system locates a particular feature vector within a corresponding feature space cell. Once created, the data model remains accurate for the given process and imaging conditions. The resultant data model is more efficient and more accurate at classifying features than heretofore known modeling techniques. Further accuracy may be obtained by simultaneous application of non-supervised methods to automatically learn the probability distribution of defect categories through multiple applications of the technique (herein termed "hyper-tree"). The resultant cell size and ratio of size of cells with the number of defects in them instantly yields information on the quality of the statistical performance. A degree of certainty of recognition can be provided along with an estimation of defect classification. In addition, the technique can be implemented in software or hardware.

BRIEF DESCRIPTION OF THE DRAWINGS

These and other objects, advantages and features of the present invention will be more readily understood from the following detailed description of certain preferred embodiments thereof, when considered in conjunction with the accompanying drawings in which.

BEST MODE FOR CARRYING OUT THE INVENTION

In the detailed embodiments described herein, the claimed invention is referred to as "hyper-tree."

In a hyper-tree method, each defect or feature is initially described by a feature vector containing n measurements or characteristics of the feature. These vectors form a multi-dimensional (or, more specifically, n-dimensional) feature space where the number of dimensions is equal to the number "n" of measurements in the feature vector. Statistical analysis pursuant to the present invention is enhanced by inclusion of greater than three elements or measurements per feature vector. The inventive method breaks down this feature space to form clusters for each defect class. A data model results directly from the clusters of sample data. This data model is ultimately transferred to the on-line defect imaging system and used to categorize new defect data in real-time.

Algorithms

The hyper-tree algorithm uses a type of heuristic search, referred to in the art as a "minimax search", which is similar to that used in game theory because it recursively subdivides a multi-dimensional feature space by assuming the presence of a malicious opponent that is trying to destroy the purity of a hyper-cube by introducing features assigned to other classes. It combines this approach with a technique similar to oct-trees used to segment 3-d space for positioning and measuring geometric solids. The oct-tree approach is extended from three dimensions into multiple dimensional (i.e., greater than three-dimensional) "hyper-space" to form a "hyper-tree." It recursively divides the space into smaller and smaller hyper-cubes trying to maintain the purity of the region in hyper-space. The hyper-tree algorithm terminates when a region is pure or when a predefined minimum cell size is reached.

The hyper-cube is initially assumed to be an unspecified classification, empty of all points. The first point to arrive in an empty hyper-cube causes the cube to be sub-divided into $2^d$ child hyper-cubes. As each new point of a given class appears, and it is placed in an empty barren region or in a region of a different class, a sub-division occurs. If the point appears in a classified pure hyper-cube then the count is augmented for that hyper-cube. This process continues recursively until all points in the training sample are read. Since the feature space is a discrete sampled space, the subdivision is repeated only enough times to yield unit-sized hyper-cubes as leaf-nodes on the classification hyper-tree. Hyper-tree doesn't necessarily resolve to a minimum type cell. For example, another criteria can be used to terminate the heuristic search yielding larger than real size hyper-cubes, herein referred to as the maximum decomposition level. In general, an impure leaf-node indicates that points of opposing categories occurred in approximately the same position of hyper-space.

Figure 3:
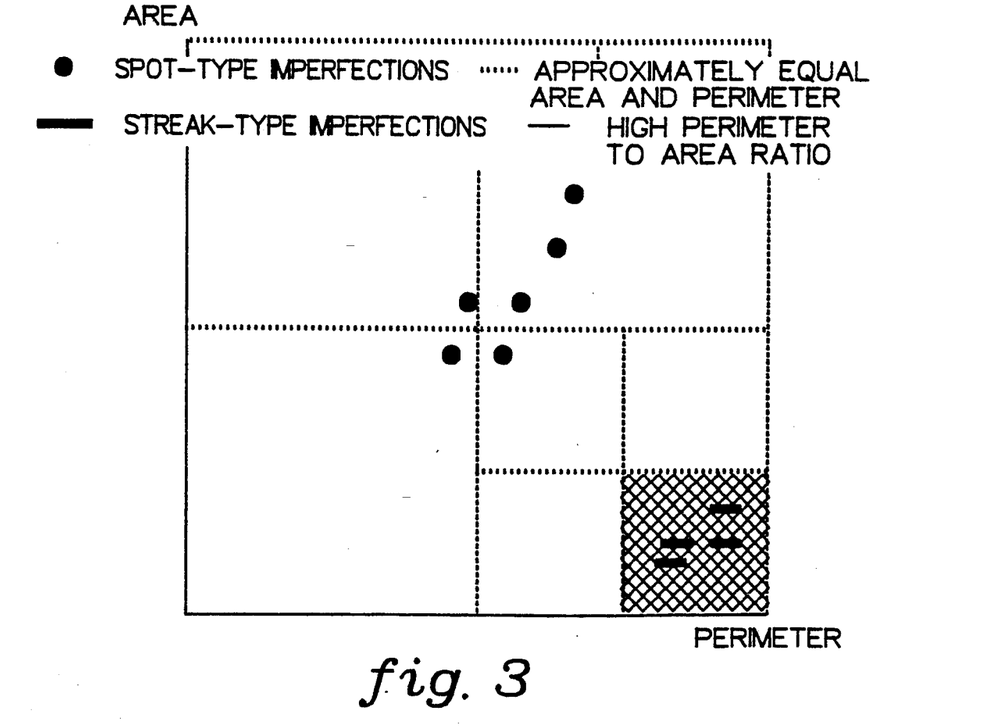
FIG. 3 graphically depicts a simple example of two-dimensional recursive subdivision of feature space pursuant to the present invention.

FIG. 3 is a simplified, two-dimensional example of how the feature space might be divided to distinguish two defect categories in 2-d feature space where each feature vector consists of area and perimeter. In this case the feature space is sub-divided to yield pure squares for each category. The points which fall within the dotted squares are classified as spots and the points which fall within the cross-hatched area are classified as streaks. The clear areas are unclassified. If the points of opposing categories were closer together, the space would be sub-divided into still smaller squares. A more realistic example, however, is harder to illustrate because of the difficulty of drawing multi-dimensional space. If two more dimensions such as length and width are included they would subdivide the resultant hyperspace more accurately. Also in practical applications, an unspecified classification, such as category zero, can be included to cover any defects or features in the training sample not explicitly categorized.

The number of leaf-nodes and the level of decomposition indicate the quality of the training sample and the success the resulting data model will have in differentiating between defect categories. Loss and risk functions are generated by considering the ratio of the number of points of other categories in a region dominated by a given category. The encoded feature space or resulting data model is saved, e.g., to a disk, using one bit to indicate the presence of each child hyper-cube. This model can then be read by an on-line image processing program for classification of fresh data in real-time. An overview of one software embodiment of model building pursuant to the present invention is set forth below.

| | |
|---|---|
| Main program | reads each feature in the training sample from the database calling Decompose after reading each new feature. |
| Decompose | puts the feature in the hyper-cube if it is of the same type, a minimum sized hyper-cube, or empty. If the node hasn't been initialized yet, it is initialized. If the node is not a leaf node, Decompose is called recursively. If the node is a leaf-node but not a minimum node then Try-to-Exclude is called for every point in the node that has a category different from the current feature. Decompose is then called recursively for every feature of the same category as the current feature. |
| Try-to-Exclude | puts the feature in the node if it is a minimum cell, or empty. If the node hasn't been initialized yet, it is initialized. If the node is a leaf-node but not a minimum node the Decompose is called for every point in the node that has a category the same as feature. Try-to-Execude is then called recursively with the feature. |
| Traverse | accumulates the statistics of the data model. It traverses the hyper-tree calculating the a priori and a posterior probabilities, the mean, the variance and the cost and risk functions for each defect category. |
| Printstat | prints a summary of the statistics gathered by Traverse. |
| Writemx | recursively descends the hyper-tree writing a data model to the disk using an encoded form where only one bit is used for each child hyper-cube. |

The pseudo-code below describes the principal program components summarized above. Variable namesare in italics. © 1992 Eastman Kodak Company Main program
    Initialize head pointer to hyper-tree.
    Establish maximum level of decomposition.
    Determine minimum cell size for leaf-nodes.
    For n = 1 to the total number of features (N) do
    the following
        Read $feature_n$ from Segmented Image Database
        Call Decompose ($feature_n$, head) which
        attempts to place feature in correct hyper-cube.
    Call Traverse to accumulate the statistics for
    each category.
    Call Printstat to print the statistics.
Decompose (feature, node)

-continued

```
If node is at minimum size or the maximum level
    of decomposition is reached then
        put feature in child's list of features
    else is node is leaf node then
        if there are no points of other categories
            in node then
                put feature in node's list of features
            else begin block
                find center of cell for point feature.
                if child cell corresponding to new
                    center is NIL then
                        make new child-cell
                call Decompose (child-cell, feature)
                for all categories Ω={ω₁ ... ωₖ},i=1 ... k
                    do
                        if category of feature is not the
                            same as ωᵢ then begin
                                for all old points in node's
                                    list of category ωᵢ do
                                        take old point,
                                        oldpoint of category ωᵢ
                                        from list
                                        find center of cell for
                                        oldpoint.
                                        if child-cell for new
                                            center is NIL
                                                make new child-
                                                cell
                                            call Try-to-Exclude
                                            (child_cell, oldpoint)
                                        end for all
                                end if
                        end for all
                end of block
            else begin block
                find center of cell for feature.
                if child cell corresponding to new center
                    is NIL then
                        make new child-cell
                call Decompose (child-cell, feature)
            end of block
    end of procedure Decompose.
Try-to-exclude (feature, node)
    If node is minimum size or maximum level of
        decomposition is reached then
            put feature in node's list of features
        else if node is leaf-node then
            if there are no points of other categories
                in node then
                    put feature in node's list of features
                else begin block
                    find center of cell for feature.
                    if child-cell corresponding to new
                        center is NIL then
                            make new child-cell
                    for all points in child-cell's list
                    for category of feature do
                        take oldpoint from list
                        find center of cell for oldpoint
                        if child cell corresponding to
                            new center is NIL then
                                make new child-cell
                            call Decompose (child-cell,
                            oldpoint)
                        end for all
                        call Decompose (child-cell, feature)
                        to push feature down list.
                    end of block
                else begin block
                    find center of cell for point feature.
                    if child-cell corresponding to new center
                        is NIL then
                            make new child-cell
                        call Try-to-Exclude (child-cell, feature)
                end of block
            end of procedure Try-to-Exclude.
Traverse
    For category = 0 to maximum feature type do
        Initialize area and count to 0
        For i = 0 to Max Dimension Do
            Initialize mean and variance to 0
        Initialize risk, apriori and aposteriori to
            0
    For level = 0 to Maximum decomposition level do
        Initialize area and count to 0
    If root node is not barren
        bump level
        For n = 0 to 2^DIM do
            if child cube (n) exists
                call follow branch to accumulate
                    sum for mean
        calculate mean
        for category = 0 to maximum feature
            type do
                if count for this cat is 0
                    mean = 0
                else
                    mean = sum/count [category]
                calculate aposteriori
                if volume_total[category] is 0
                    aposti = 0
                else
                    aposti = count/volume total
        Do the traversal again to get sum² for
            variance
        for n = 0 to 2^DIM
            if root is not barren
                call follow again
        Now calculate standard deviation and
            apriori
    for category 1 to maximum feature type do
        apriori = count/total
        for i = 0 to DIM
            SD[i] = sqrt [sum²/total count]
        For category 2 to maximum feature type DO
            if category 1 = category 2
                expected loss [category 2] = 0
            else
                expected loss = vol_count
                    [category 1 * category 2]
                    / category_count * apriori
                    for category 1.
            risk = 1 category_count/volume
                total [category 1].
Follow branch
    If this note is barren it is a leaf node
        sum area
        find the category of this cell
        sum feature vectors into array
    else
        for n = 0 to 2^DIM
            if progeny [n] exists
                call follow branch
Follow again
    if this node is a leaf node
        for each vector in this cell
            sq_accum = sq_accum + (vector[i] -
            mean[i])² Used to calculate variance
            and standard deviation
    else
        for n = 0 to 2^DIM
```

Implementation of Hyper-tree

Figure 4:
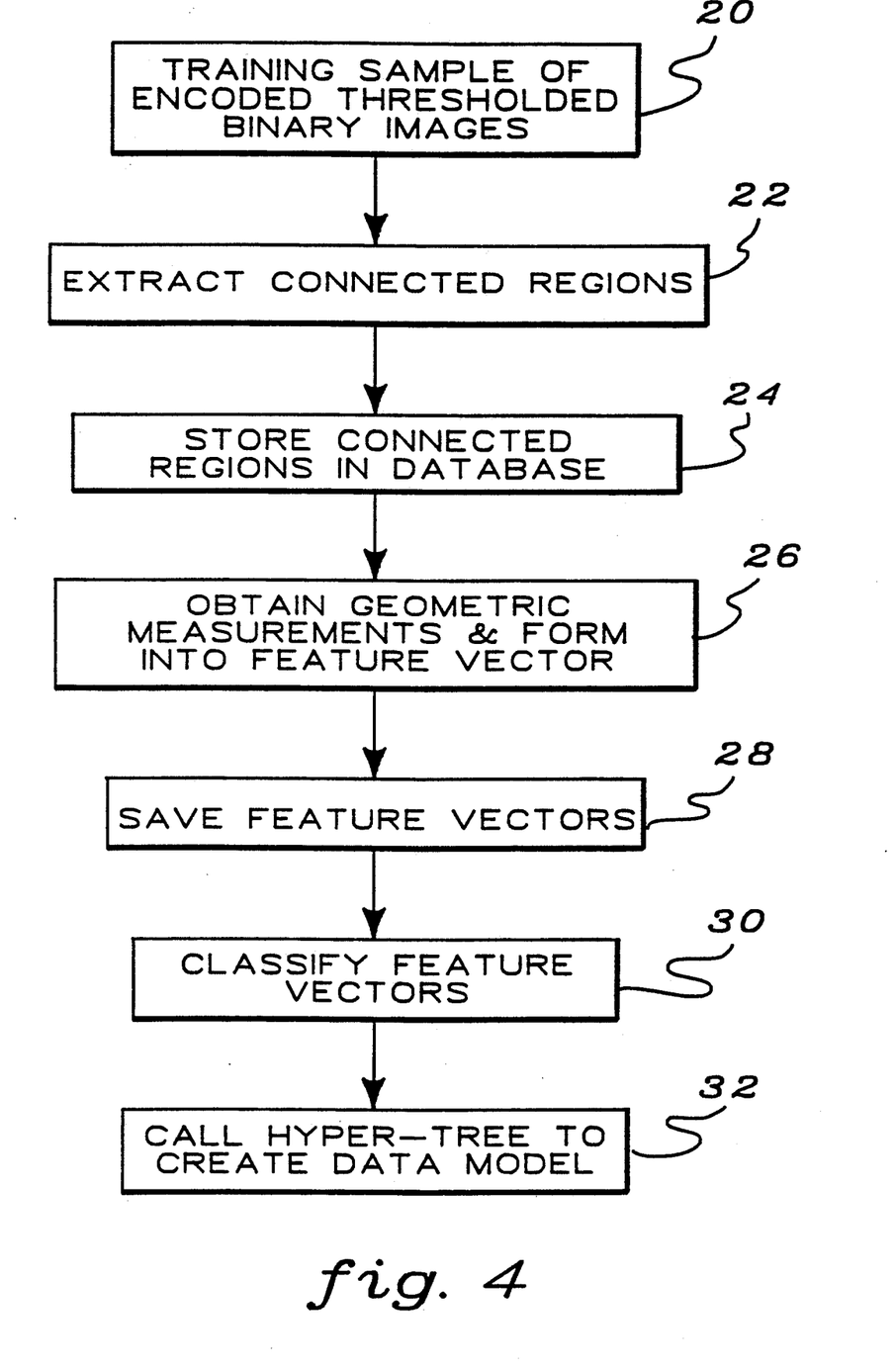
FIG. 4 is a functional flowchart of one embodiment of preliminary processing during creation of a data model pursuant to the present invention.

Referring to FIG. 4, the Hyper-tree method of supervised classification requires a large training sample, which comes from the real-time imaging system in the form of encoded thresholded binary images, 20 "Training Sample of Encoded Threshold Binary Images." The connected regions or features are then extracted from the image by performing a connectivity analysis, 22 "Extract Connected Regions." Each connected region is described by a list of vertices, a boundary description or an enclosing polygon. Each list of vertices is stored in a database indexed by a unique identifier or feature number, 24 "Store Connected Regions in Database."

Geometric measurements are obtained from each region in the database and formed into an array of integers called a feature vector, 26 "Obtain Geometric Measurements & Form Into Feature Vector." This array includes, for example, x and y positions, width, length, perimeter and area such that multi-dimensional hyper-space is defined thereby. Each feature vector is stored in the database indexed by the feature number, 28 "Save Feature Vectors." After this step the database contains information describing all the features in the training sample.

For supervised classification as in hyper-tree, it is necessary to establish a priori classifications of each feature of interest in the training sample. Pictures of all the features are displayed on the screen of a graphic workstation so an expert can scroll through them marking all interesting features with the appropriate classifications, 30 "Classify Feature Vectors."

Hyper-tree reads the sample set of classified features from the database, develops the classifier or data model and stores it, 32 "Call Hyper-Tree To Create Data Model." This is accomplished by building a multi-dimensional hyper-tree in memory, dividing the feature space as specified by the classifications of the sample data. The a priori probability, the a posteriori probability, mean, variance, loss function, and the risk function for each defect category are all preferably calculated (and printed). The loss function is the probability of choosing any wrong classification for a given feature when the true state of nature is a different classification. The risk function is the probability of choosing a specific wrong classification.

Figure 5:
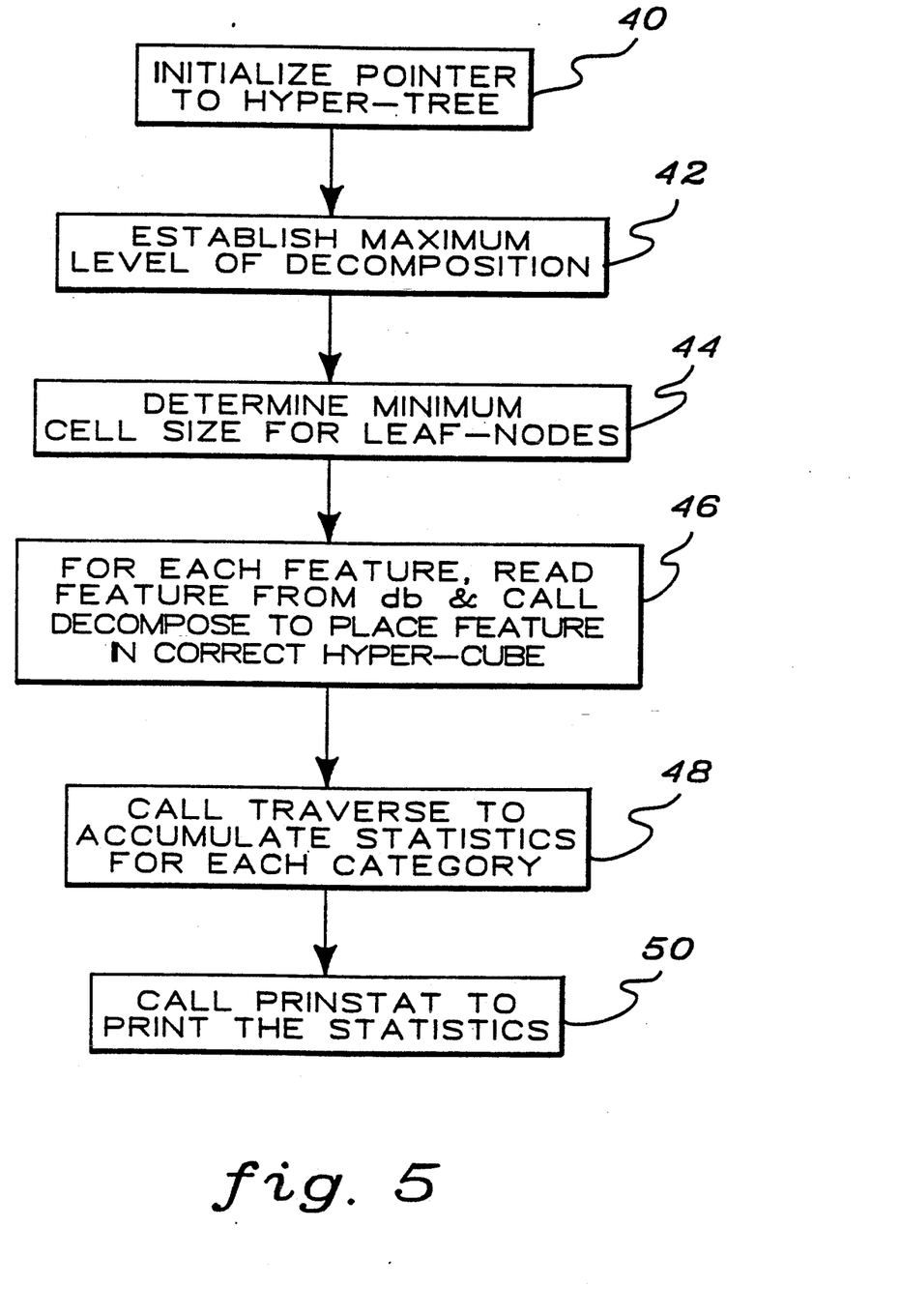
FIG. 5 is a functional flowchart of a specific embodiment of "hyper-tree" processing pursuant to the present invention.

FIG. 5 depicts a specific hyper-tree processing approach utilizing the subroutines summarized above. Hyper-tree processing begins by initializing a pointer to the main program, 40 "Initialize Pointer To Hyper-Tree." Thereafter, the maximum level of decomposition is determined, 42 "Establish Maximum Level Of Decomposition," and a minimum cell size is determined, 44 "Determine Minimum Cell Size For Leaf-Nodes." For each stored feature, the decomposed subroutine is called to place the feature in a correct hyper-cube, 46 "For Each Feature, Read Feature From Database & Call Decompose (Feature $_n$, Head) To Place Feature In Correct Hyper-Cube." Once each feature has been positioned, the classification-tree is traversed to accumulate statistics for each classification, 48 "Call Traverse To Accumulate Statistics For Each Category," and the statistics are printed, 50 "Call Prinstat To Print The Statistics."

By way of example, Table 1 below is an output listing from one embodiment of hyper-tree run on a sample of two defect types on motion picture film. The table shows the extent of the subdivision of the feature space, the calculated cost and risk functions and the mean and standard deviation for each element in the feature vector.

TABLE 1

| CAT | LEVEL | POINTS | AREA |
|---|---|---|---|
| All | 0 |  | 0 |
| 0 |  | 0 | 0 |
| 1 |  | 0 | 0 |
| 2 |  | 0 | 0 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 1 |  | 2048 |
| 0 |  | 1 | 2048 |
| 1 |  | 0 | 0 |
| 2 |  | 0 | 0 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 2 |  | 0 |
| 0 |  | 0 | 0 |
| 1 |  | 0 | 0 |
| 2 |  | 0 | 0 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 3 |  | 512 |
| 0 |  | 0 | 0 |
| 1 |  | 1 | 512 |
| 2 |  | 0 | 0 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 4 |  | 0 |
| 0 |  | 0 | 0 |
| 1 |  | 0 | 0 |
| 2 |  | 0 | 0 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 5 |  | 0 |
| 0 |  | 0 | 0 |
| 1 |  | 0 | 0 |
| 2 |  | 0 | 0 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 6 |  | 0 |
| 0 |  | 0 | 0 |
| 1 |  | 0 | 0 |
| 2 |  | 0 | 0 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 7 |  | 32 |
| 0 |  | 2 | 32 |
| 1 |  | 0 | 0 |
| 2 |  | 0 | 0 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 8 |  | 192 |
| 0 |  | 1 | 48 |
| 1 |  | 1 | 48 |
| 2 |  | 2 | 96 |
| 3 |  | 0 | 0 |
| 4 |  | 0 | 0 |
| 5 |  | 0 | 0 |
| 6 |  | 0 | 0 |
| 7 |  | 0 | 0 |
| 8 |  | 0 | 0 |
| All | 9 |  | 160 |
| 0 |  | 1 | 80 |
| 1 |  | 1 | 32 |
| 2 |  | 1 | 48 |

TABLE 1-continued

| CAT | LEVEL | POINTS | AREA |
|---|---|---|---|
| 3 | | 0 | 0 |
| 4 | | 0 | 0 |
| 5 | | 0 | 0 |
| 6 | | 0 | 0 |
| 7 | | 0 | 0 |
| 8 | | 0 | 0 |
| All | 10 | | 104 |
| 0 | | 1 | 84 |
| 1 | | 1 | 24 |
| 2 | | 1 | 4 |
| 3 | | 0 | 0 |
| 4 | | 0 | 0 |
| 5 | | 0 | 0 |
| 6 | | 0 | 0 |
| 7 | | 0 | 0 |
| 8 | | 0 | 0 |

Sample statistics for each category

For Category: 0

| | width | length | area | Perimeter | Pj length |
|---|---|---|---|---|---|
| mean | 2.604 | 0.788 | 23.074 | 6.600 | 1.794 |
| S.D. | 4.45 | 4.65 | 556.91 | 17.79 | 4.66 |

Expected Loss

| Category: | Loss: |
|---|---|
| 0 loss | 0.00 |
| 1 loss | 0.00 |
| 2 loss | 0.00 |
| 3 loss | 0.00 |
| 4 loss | 0.00 |
| 5 loss | 0.00 |
| 6 loss | 0.00 |
| 7 loss | 0.00 |
| 8 loss | 0.00 |

| Area | Count | apriori | aposti | risk |
|---|---|---|---|---|
| 2292 | 860 | 0.96 | 1.00 | 0.00 |

Sample statistics for each category

For Category: 1

| | width | length | area | Perimeter | Pj length |
|---|---|---|---|---|---|
| mean | 11.200 | 11.267 | 94.133 | 55.200 | 16.600 |
| S.D. | 5.0 | 19.39 | 183.12 | 85.48 | 34.22 |

Expected Loss

| Category: | Loss: |
|---|---|
| 0 loss | 0.26 |
| 1 loss | 0.00 |
| 2 loss | 0.00 |
| 3 loss | 0.00 |
| 4 loss | 0.00 |
| 5 loss | 0.00 |
| 6 loss | 0.00 |
| 7 loss | 0.00 |
| 8 loss | 0.00 |

| Area | Count | apriori | aposti | risk |
|---|---|---|---|---|
| 616 | 15 | 0.02 | 0.79 | 0.21 |

Sample statistics for each category

For Category: 2

| | width | length | area | Perimeter | Pj length |
|---|---|---|---|---|---|
| mean | 13.882 | 8.706 | 77.176 | 49.059 | 10.765 |
| S.D. | 3.12 | 1.86 | 25.04 | 8.58 | 2.63 |

Expected Loss

| Category: | Loss: |
|---|---|
| 0 loss | 0.00 |
| 1 loss | 0.00 |
| 2 loss | 0.00 |
| 3 loss | 0.00 |
| 4 loss | 0.00 |
| 5 loss | 0.00 |
| 6 loss | 0.00 |
| 7 loss | 0.00 |
| 8 loss | 0.00 |

| Area | Count | apriori | aposti | risk |
|---|---|---|---|---|
| 148 | 17 | 0.02 | 1.00 | 0.00 |

Sample statistics for each category

For Category: 3

| | width | length | area | Perimeter | Pj length |
|---|---|---|---|---|---|
| mean | 0.000 | 0.000 | 0.000 | 0.000 | 0.000 |
| S.D. | 0.000 | 0.000 | 0.000 | 0.000 | 0.000 |

Expected Loss

| Category: | Loss: |
|---|---|
| 0 loss | 0.00 |
| 1 loss | 0.00 |
| 2 loss | 0.00 |
| 3 loss | 0.00 |
| 4 loss | 0.00 |
| 5 loss | 0.00 |
| 6 loss | 0.00 |
| 7 loss | 0.00 |
| 8 loss | 0.00 |

| Area | Count | apriori | aposti | risk |
|---|---|---|---|---|
| 0 | 0 | 0.00 | 0.00 | 0.00 |

The first part of the listing shows the breakdown of the feature space. The "areas" are actually the sizes of one edge of a hyper-cube. Large areas mean that the hyper-space was subdivided less meaning that the feature clusters are more distinct. Also the number of features of each category are shown for each level of decomposition.

The statistics are shown in the second part of the listing. The a priori probability is based on the number of features of a given category in the total sample. The loss function, risk function and the a posteriori probability are based on a determination of the "purity" of the feature clusters.

A program, Decision (discussed below), reads the classifier or data model and uses it to classify each file of new feature vectors. It first builds a hyper-tree in memory from the compact representation on the disk. Decision then reads all the feature vectors in the file and generates the classifications. It does this by traversing the hyper-tree assigning a classification when a feature falls into a leaf-node hyper-cube.

Derivation of Hyper-tree

The derivation of the formulas for a posteriori probability, calculated loss, and calculated risk functions for each defect category are shown in this section. In hyper-tree, the actual classifier or data model is based on non-parametric methods where the classifier results directly from the subdivision of feature space bypassing estimation of the probability distributions and the density function. Estimated probability distributions and density functions can be calculated from the training sample but these estimations are not used by the hyper-tree program. Hyper-tree's formula for the a posteriori probability is:

$$\frac{k_i}{k}$$

where $k_i$ is the number of features in sub-volume V of type i, and k is the total number of features in sub-volume V. If the assumption is made that the feature space is already optimally subdivided into hyper-cubes, this section shows the derivation.

In the hyper-tree method, the feature space is a discrete sampling of real feature space and the sub-divisions are binary so some sampling error may be introduced. This sampling error is presumed to be small and is not taken into account. Also since the data consists of measurements taken from a sampled image and the feature space is sub-divided no further than a minimum hyper-cube size of one, the sampling error should be negligible.

Given a set of n categories:

$$\Omega = (\omega_1 \ldots \omega_j \ldots \omega_s), 1 \leq j \leq s. \quad (1)$$

The sample set consists of a number of feature vectors X, each of which has d elements:

$$x = (x_1 \ldots x_d), \text{ forming hyper-space } R^d. \quad (2)$$

If we assume that the sample size is sufficiently large such that the apriori probability of a defect occurring as a given category $\omega_j$, $P(\omega_j)$ can be predicted accurately, than the probability of $P(\omega_j)$ is equal to:

$$p(\omega_j) = \frac{n_j}{N} \quad (3)$$

where $n_j$ is the number of points category j and N is the total number of points.

If we assume the probability P that a feature x will fall in a region in hyper-space R is, $$P = \int_R p(x')dx' \quad (4)$$

were dx' is a volume element.

$$P \approx p(x)V \quad (5)$$

where V is the volume of a region R in hyper-space.

In non-parametric techniques such as the Parzen windows and nearest neighbor methods, a hyper-volume in d-space is chosen of sufficient size to include a certain number of features of a given category $\omega_j$. In hyper-tree, the method presented herein, the hyper-volume V is chosen to contain k points such that $k \geq k_j$ where $k_j$ is all the defects of category j in volume V. The space average conditional probability density $p(x|\omega j)$ where $$p(x|\omega_j) = \frac{k_j/N}{V} \quad (6)$$

Bayes rule states that $p(\omega_j)p(x|\omega_j) = p(x)p(\omega_j, x)$ where $$p(x) = \sum_{i=1}^{S} p(x|\omega_i)p(\omega_i) \quad (7)$$

So Bayes' rule can be applied to calculate the a posteriori probability:

When a feature of type x is encountered the $$p(\omega_j|x) = \frac{p(x|\omega_j)p(\omega_j)}{\sum_{i=1}^{S} p(x|\omega_i)p(\omega_i)} = \frac{k_j}{k} \quad (8)$$

decision rule which minimizes the cost of making a wrong decision should be applied. The decision rule used in this method minimizes the overall risk given a particular sample space. This is the Bayes risk and is the minimum risk that can be achieved.

If action $\alpha_i$ is taken when the true classification is $\omega_j$, the expected loss is $$\lambda(\alpha_i|\omega_j) \quad (9)$$

This expected loss function can be estimated from the training sample by the number of points of type i in the volume V.

$$\lambda(\alpha_i|\omega_j) = \frac{k_i}{k_j} \quad (10)$$

The total conditional risk for taking action $\alpha_i$ given feature x, $R(\alpha_i|x)$ is:

$$R(\alpha_i|x) = \sum_{j=1}^{S} \lambda(\alpha_i|\omega_j)p(\omega_j|x) = \frac{k_i}{k} \quad (11)$$

Performance Analysis

In this section, the hyper-tree algorithm is analyzed and compared to other algorithms used to do statistical pattern recognition. Execution time and storage space considerations involved in the choice of non-parametric methods vs. parametric methods are discussed and some specific performance improvements of hyper-tree processing in comparison with other non-parametric methods are set forth.

Parametric methods require less storage space than non-parametric methods. In parametric methods, the underlying probability distribution functions are known and discriminant functions can be calculated from the a priori and the class conditional density functions so there is no need to store an actual representation of the feature space. Thus the total storage space requirements are minimized. Hyper-tree's use of memory is minimized by efficient binary encoding of the multi-dimensional classifier, and with the ever decreasing memory costs in today's computers the consideration of storage space requirements is of decreasing importance.

In non-parametric methods such as nearest-neighbor or Parzen windows, the computational requirements can be prohibitive for high data dimensionality. For each feature, or point in hyper-space, a volume must be selected which will grow to enclose a number of neighboring points, large enough to be able to classify the point in terms of the majority of its neighbors. This will run in $O(n^2)$ where n is the number of features for a one category classifier. For a two category classifier this will run in $O(n^4)$ and for three categories, it will run in $O(n^8)$. For c classes, it will run in $O(n^{2**c})$.

In hyper-tree the feature space is decomposed by successive binary division. Therefore the worst case execution time for a one category classifier when the feature space is completely decomposed is $O[n\log(n)]$, where n is the number of features. An increase in dimensionality does not greatly increase execution time. The factor is linear because there is only one more compare operation per feature for every extra element in the feature vector. For multiple categories the effect is as follows. For two categories hyper-tree will run in $O[n^2\log(n)]$, for three categories it will run in $O[n^3\log(n)]$, and for c categories, $O[n^c\log(n)]$. Although there is degradation in performance of hyper-tree for very large numbers of unique categories the performance doesn't degrade as fast as other methods.

Operational Defect Classification System Using Hyper-Tree

Figure 6:
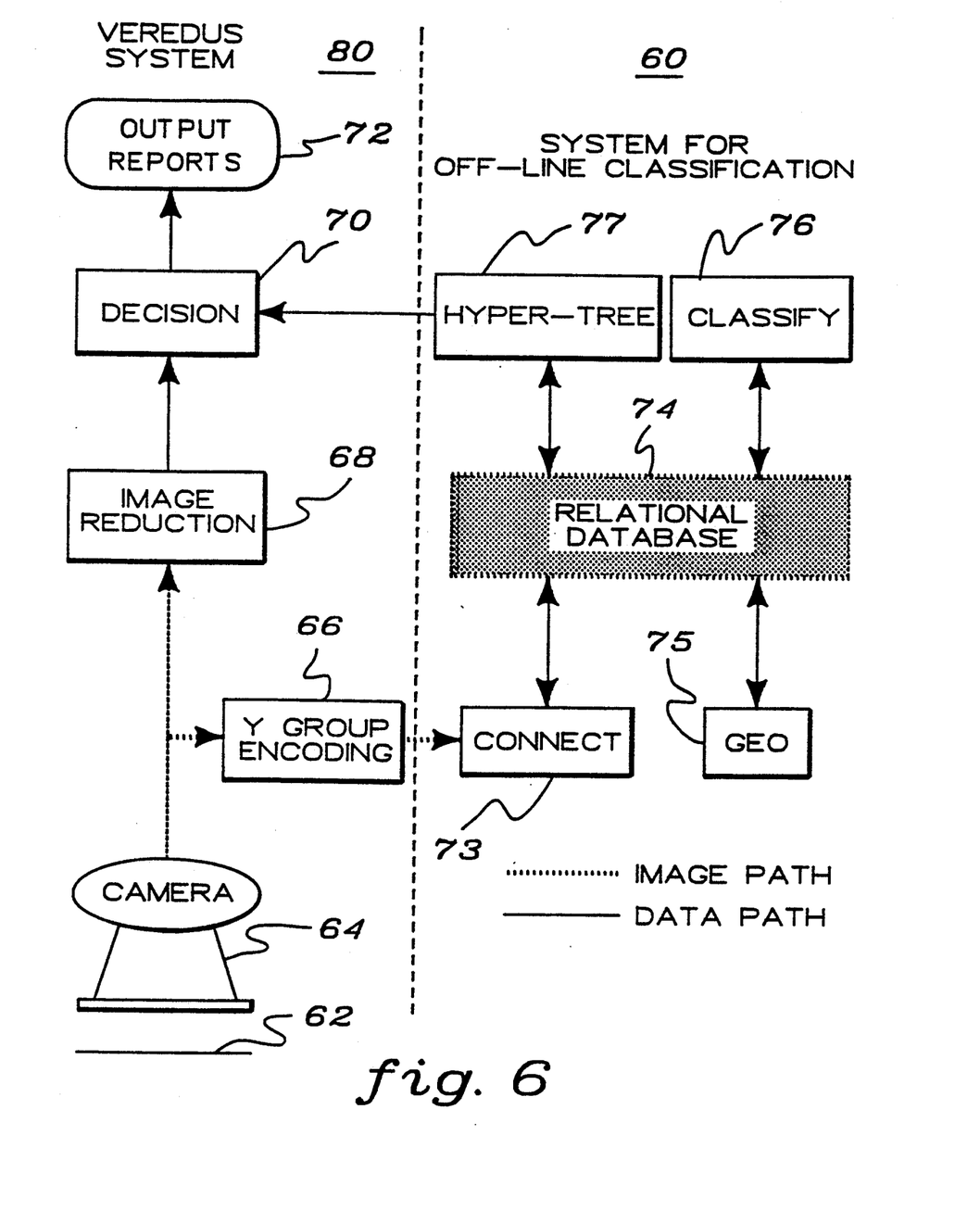
FIG. 6 is a block diagram representation of one system embodiment of the present invention.

This section discusses a complete system, shown in block diagram form in FIG. 6, using an off-line workstation (denoted 60) and a VEREDUS TM Real-time Surface Flaw Detection and Analysis System, labeled 80, which is marketed by EKTRON Applied Imaging, Inc., an Eastman Kodak Company located in Rochester, N.Y., to recognize and classify defects by category. At the core of this system is the hyper-tree method of statistical pattern recognition.

The VEREDUS TM system 80 is a special purpose fast pipe-lined image processing system used to detect surface or imbedded flaws or defects optically in a web 62 based coating, plating or similar process. VEREDUS TM can be connected to one or more linear optical image sensors 64. It produces reports 72 which are statistical tabulations of defect types and statistics for an operator (not shown).

Hyper-tree is part of a system 60 used to "teach" the VEREDUS TM real-time system 80 to recognize defects on a moving web while it is scanning in real-time. This program is integrated with other programs in a system centered on a relational defect database 74. The system consists of the following programs: (1) Connect 73 which segments the image and inserts the segmented image information into the database 74; (2) Geo 75 which takes the geometric measurements of the defects forming the feature vectors and puts the results into the database 74; (3) Classify 76 which is a program run by the operator to assign apriori or known classifications to the features in the "training sample"; and (4) Hyper-tree 77, described above which partitions the feature space to form the classifier or classification model, called here the "OFCLAS Data Model." There is also a fifth program, Decision 70 in System 80 which takes the data model, OFCLAS, and applies it to new as yet unclassified data, i.e., to do an a posteriori classification operation.

A special mode is available on VEREDUS TM system 80 to grab part of a scanned image of interest in compressed form, known as Y-group encoding 66. This Y-group encoded image can be moved from the VEREDUS TM system to the off-line classification system 60 through either shared VMEbus memory, serial port or tcp/ip if system 80 is so equipped.

| | |
|---|---|
| 1. | Connect obtains the compressed image. This is generally a binary image, e.g., 1 bit per pixel, but could have more bits per pixel. The image is decompressed from Y-group coding as it is segmented into physically separate features by following each scan line and recording each intersection with a change in the image pixel value. This in effect finds the boundaries of each feature in the image. After thinning to reduce the number of vertices to the minimum necessary, each feature is stored in the database as a list of x,y pairs of vertices which describe the outline or boundary of all negative and positive space of the feature. In other words, the outer boundary is stored along with the boundaries of any holes or negative regions. Each of these features is stored in the database with a unique key. |
| 2. | Geo reads the features from the database and takes geometric measurements of each one. These measurements form what is called a feature vector, i.e., a list of numbers describing the geometric characteristics of each of these features. The feature vector can include the width at the widest point, the length along the longest point, the perimeter, and the area excluding any holes. It can also optionally include the x,y coordinate position, the centroid or center of gravity and the projected length. Geo puts the feature vector for each feature into the database and keys it to the boundary obtained by Connect. |
| 3. | Classify paints a graphical representation of the original image on the screen of the off-line workstation using the boundary vertex lists found in the database and allows the user to choose features of interest by picking them with a mouse. The user of the program can choose a classification for each feature of interest. This is how the a priori classifications are determined. Each of these a priori classifications are stored in the database and keyed to the boundary list and the feature vector described above. |
| 4. | The Hyper-tree program is run to create the classifier or classification model. This model is known as the OFCLAS data model. The method used by Hyper-tree to develop this model is described in detail above. The model is transferred to the VEREDUS TM system 80 using one of the above-noted interfaces. |
| 5. | Decision classifies new data according to the model. There can also be a version to be run on the off-line system to verify or check the results. |

Figure 7:
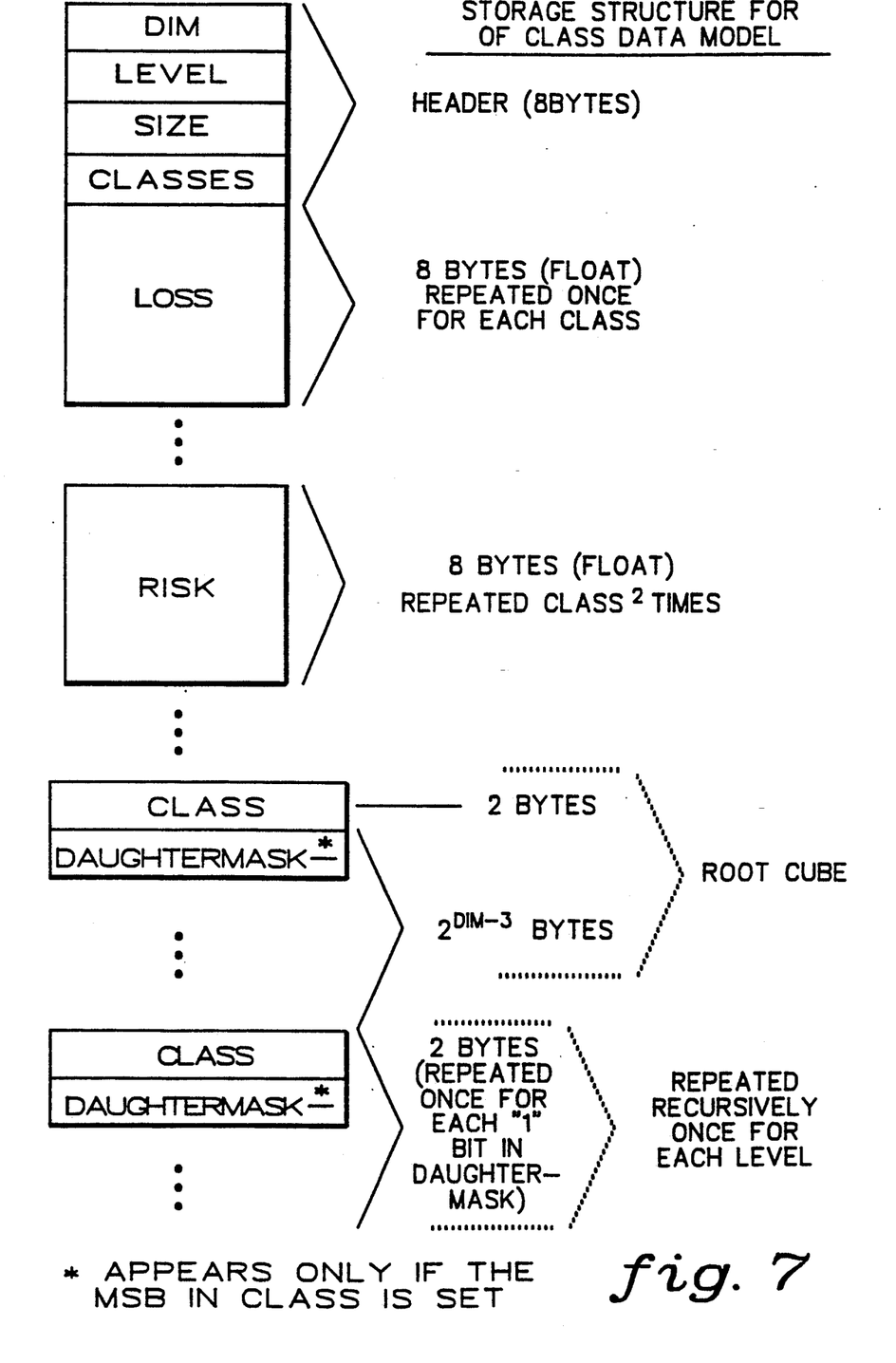
FIG. 7 is a block diagram of one embodiment of storage structure for a data model constructed pursuant to the present invention.

FIG. 7 depicts one embodiment of a data model structure, again denoted "OFCLAS" and constructed pursuant to of the present invention. Standardized names and numbers are preferably assigned to each measurement. In the sample data model of FIG. 7, the following terms apply:

| | |
|---|---|
| Dim | The dimensionality of the data model. This is equivalent to the number of elements in the feature vector. |
| Level | The number of decomposition levels used in this model. |

| | -continued |
|---|---|
| Class | The classification. |
| MAXCLASS | The maximum number of classifications or categories possible. |
| Risk | The loss function (or cost) associated with choosing category j when the actual category is i. This is implemented as a 2 dimensional array of MAXCLASS elements where each element is a floating point number. |
| Loss | The loss function (or cost) associated with any wrong choice of category. This is represented as an array of floating point numbers. |
| Daughtermask | The mask has one bit for every possible daughter, where the maximum number of daughters is $2^{dim}$. A 1 in a bit position means that a daughter exists, a 0 means the daughter doesn't exist. There is always a Daughtermask in the root node. In other nodes the Daughtermask exists only if the class of the node is >0. |
| Cube | The data structure containing the classification and the Daughtermask for the next level. If the cube is a leaf-node, the class is >0. If the class is less than 0, a Daughtermask follows. |

The data structure is recursive where the maximum possible number of cubes is equal to the number of decomposition levels multiplied by 2 raised to the power of the dimensionality, dim. Or in other words $$\text{maxcubes} = \text{level} \times 2^{dim}.$$

Expressed in "C" the maximum number of cubes is $$\text{maxcubes} = \text{level} * (1 << \text{dim}).$$

The number of bytes necessary for the daughtermask is $$2^{dim-3}.$$

Expressed in "C" the daughter mask is defined as:

char daughtermask [1 << (dim−3)].

The actual number of cubes will generally be much less than the maximum. It is related to the quality of the classifier, the statistical distribution of the original data in the training sample which was used to create the model.

The top of the data model will have a header. Next will be the loss function array, followed by the risk arrays. Finally the cubes are found in order from the root cube to the leaves.

It will be observed from the above discussion that a novel method for generating a statistical model from a sampled test image (or, preferably, a plurality of sampled test images) is provided. The flexible, non-parametric approach presented produces a classification tree to be depth-first searched by an on-line image processing system, e.g. as part of a quality control process. The processing system locates a particular feature vector within a corresponding feature space cell. Once created, the data model remains accurate for the given process and imaging conditions. The resultant data model is more efficient and more accurate at classifying features than heretofore known modeling techniques. Further accuracy may be obtained by simultaneous application of non-supervised methods to automatically learn the probability distribution of defect categories through multiple applications of the technique (herein termed "hyper-tree"). The resultant cell size and ratio of size of cells with the number of defects in them instantly yields information on the quality of the statistical performance. A degree of certainty of recognition can be provided along with prior estimations of defect classification. In addition, the technique can be implemented in software or hardware.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

I claim:

1. A method for generating a statistical classification model from a sample test image having a plurality of features thereon, said statistical classification model for use in real-time feature classification by an image processing system, said method comprising the steps of:
   (a) imaging said sample test image with said plurality of features thereon to produce a digital image representation thereof;
   (b) assigning a unique classification to selected features of the same type in said sample test image by referencing said digital image representation;
   (c) producing an n-element feature vector for each feature classified in said step (b), said n-element feature vectors defining an associated n-dimensional feature space;
   (d) using said classifications assigned in said step (b) to cluster feature vectors in feature space, said clustering resulting from a minimax search to define a tree-like hierarchical decomposition of n-dimensional feature space based upon said assigned feature classifications; and
   (e) storing the hierarchically decomposed n-dimensional feature space resulting from said clustering of step (d) for access by said image processing system for real-time feature classification of a new image.

2. The method of claim 1, wherein said minimax search clustering step (d) proceeds by defining a hierarchical decomposition of n-dimensional feature space such that each terminal feature cell thereof contains only feature vectors corresponding to the same classification, or is empty or is of a predefined minimum cell size for said decomposed feature space.

3. The method of claim 2, wherein at least two different feature types exist in said sample test image and wherein said step (b) comprises assigning a unique classification to each of said feature types.

4. The method of claim 3, comprising the step of cumulatively repeating steps (a)–(d) for a plurality of sample test images such that a plurality of features of each feature type are clustered within the hierarchically decomposed n-dimensional feature space.

5. The method of claim 4, wherein the resultant hierarchical decomposition of n-dimensional feature space comprises a supervised classifier for real-time feature classifying of a new image by said image processing system.

6. The method of claim 3, wherein said clustering step (d) includes the steps of:
   (i) selecting a feature vector and locating said feature vector within feature space,
   (ii) selecting another feature vector and locating said another feature vector within said feature space,
   (iii) selectively decomposing said feature space if at least two feature vectors of different classifications are disposed within the same feature space cell, said selective decomposing continuing until said at least two feature vectors of different classifications are located in different cells or until said predefined minimum cell size is reached,
   (iv) repeating steps (ii) and (iii) for each of said feature vectors produced in step (c), the resultant decomposed feature space of step (iii) comprising said tree-like hierarchical decomposition of n-dimensional feature space.

7. The method of claim 3, wherein said step (c) includes producing a multi-element feature vector for each classified feature in the digitally represented image such that said step (d) produces a tree-like hierarchical decomposition of multi-dimensional feature space.

8. The method of claim 3, wherein said minimax search employed in said step (d) includes selectively decomposing feature space by a power of two.

9. The method of claim 8, further comprising establishing a maximum level of feature space decomposition for said minimax search of said step (d).

10. The method of claim 9, further comprising determining a minimum cell size for said minimax search decomposition of said feature space during said step (d).

11. The method of claim 3, further comprising the step of transferring said tree-like hierarchical decomposition of n-dimensional feature space to said on-line image processing system.

12. The method of claim 3, wherein said classification assigning step (b) is manually accomplished by an operator.

13. The method of claim 3, wherein said imaging step (a) includes defining features as connected regions within the imaged sample test image and obtaining n-geometric measurements of said connected regions, said geometric measurements being utilized in said step (c) to form said n-element feature vectors.

14. A real-time image processing method for classifying web features using a supervised statistical classifier, said statistical classifier comprising a tree-like hierarchical decomposition of n-dimensional feature space wherein different feature types are clustered in different feature space cells of the hierarchical tree, said method comprising the steps of:
   (a) imaging said web and producing a digital image representation thereof, said imaging including producing an n-dimensional feature vector for selected web features;
   (b) referencing said supervised statistical classifier and automatically clustering feature vectors within corresponding feature space cells of said tree-like hierarchical decomposition of n-dimensional feature space, for each of said feature vectors said locating step comprising searching said hierarchical decomposition of feature space for the smallest cell of said hierarchical tree including said feature vector; and
   (c) accumulating statistics on imaged features based on said located feature vectors of said step (b), said statistics providing for each such located feature vector a feature-type classification for said corresponding feature.

15. The real-time image processing method of claim 14, wherein said supervised statistical classifier comprises a tree-like hierarchical decomposition of multi-dimensional feature space, and wherein said imaging step (a) includes producing a multi-dimensional feature vector for selected web features.

16. The real-time image processing method of claim 14, wherein said web to be imaged in said step (a) is moving.

17. The real-time image processing method of claim 16, wherein said moving web comprises a moving web of film material, and wherein said web features imaged in said step (a) comprise imperfections in said film material.

18. The real-time image processing method of claim 16, wherein said moving web comprises a moving web of material, and wherein said web features imaged in said step (a) comprise surface imperfections in said moving web material.

19. The real-time image processing method of claim 14, further including predefining said supervised statistical classifier prior to said steps (a)-(c).

20. The real-time image processing method of claim 19, further comprising pre-storing said supervised statistical classifier for real-time referencing thereof during said step (b).

21. The real-time image processing method of claim 19, wherein said classifier predefining step comprises the steps of:
   (i) imaging a plurality of sample test images having features thereon and producing digital image representations thereof;
   (ii) assigning a unique classification to selected features of the same type by referencing said digital image representations;
   (iii) producing an n-element feature vector for each feature classified in said step (ii), said n-element feature vectors defining an associated n-dimensional feature space; and
   (iv) using said classifications assigned in said step (ii) to cluster feature vectors in feature space, said clustering employing a minimax search to define a tree-like hierarchical decomposition of n-dimensional feature space based upon said assigned feature classifications, said tree-like hierarchical decomposition of n-dimensional feature space comprising said supervised statistical classifier.

22. The real-time image processing method of claim 21, wherein said minimax search employed in said step (iv) includes selectively decomposing feature space by a power of two.

23. The real-time image processing method of claim 14, further comprising transferring said statistics accumulated in said step (c) for quality control supervision of said imaged web by printing, displaying or downloading said statistics to a processing unit.

24. A real-time image processing system for classifying web features using a supervised statistical classifier, said statistical classifier comprising a tree-like hierarchical decomposition of n-dimensional feature space wherein different feature types are clustered in different feature space cells of the hierarchical tree, said system comprising:
   means for imaging said web and producing a digital image representation thereof, said imaging means including means for producing n-dimensional feature vectors for selected web features;

means for referencing said supervised statistical classifier and automatically clustering feature vectors within corresponding feature space cells of said tree-like hierarchical decomposition of n-dimensional feature space, for each of said feature vectors said locating means comprising means for searching said hierarchical decomposition of feature space for the smallest cell of said hierarchical-tree including said feature vector; and means for accumulating statistics on said selected web features based on said located feature vectors, said statistics providing for each located feature vector a feature-type classification for said corresponding web feature.

25. The real-time image processing system of claim 24, further comprising storage means for holding said supervised statistical classifier for real-time searching thereof by said referencing means.

26. The real-time image processing system of claim 24, wherein said web to be imaged by said imaging means is moving.

27. The real-time image processing system of claim 26, wherein said web comprises a moving web of film material, and wherein said web features imaged by said imaging means comprise imperfections in said film material.

28. The real-time image processing system of claim 26, wherein said web comprises a moving web of material, and wherein said web features imaged by said imaging means comprise surface imperfections in said moving web material.

29. The real-time image processing system of claim 24, further comprising means for predefining said supervised statistical classifier, said predefining means comprising:

means for imaging a plurality of sample test images having features thereon and producing digital image representation thereof;

means for assigning a unique classification to selected features of the same type by referencing said digital image representations;

means for producing an n-element feature vector for each feature classified, said n-element feature vectors defining an associated n-dimensional feature space; and means for clustering feature vectors in feature space using said assigned classifications, said clustering means employing a minimax search to define a tree-like hierarchical decomposition of n-dimensional feature space based upon said assigned feature classifications, said tree-like hierarchical decomposition of n-dimensional feature space comprising said supervised statistical classifier.

30. The real-time image processing system of claim 29, wherein said minimax search employed by said clustering means includes means for selectively decomposing feature space by a power of two.

31. A system for generating a statistical classification model from sample test images having a plurality of features thereon, said statistical classification model being for use in real-time feature classification by an image processing system, said model generating system comprising:

means for imaging said sample test images to produce digital image representations thereof;

means for assigning a unique classification to selected image features of the same type by referencing said digital image representations;

means for producing an n-element feature vector for each classified feature, said n-element feature vectors defining an associated n-dimensional feature space; and means for clustering said feature vectors in feature space based upon said assigned classifications, said clustering means including means for performing a minimax search to define a tree-like hierarchical decomposition of n-dimensional feature space based upon said assigned feature classifications for use in said clustering, said tree-like hierarchical decomposition of feature space comprising said statistical classification model.

32. The model generating system of claim 31, wherein said clustering means proceeds to define a hierarchical decomposition of n-dimensional feature space such that each terminal feature cell thereof contains only feature vectors corresponding to the same classification, or is empty, or is of a predefined minimum cell size for said decomposed feature space.

33. The model generating system of claim 32, wherein said minimax search employed by said clustering means includes means for selectively decomposing feature space by a power of two.

34. The model generating system of claim 31, further comprising means for transferring said tree-like hierarchical decomposition of n-dimensional feature space to said image processing system.

35. The model generating system of claim 31, wherein said classification assigning means is manually accomplished by an operator.

* * * * *